United States Patent [19]

Bernat

[11] Patent Number: 4,548,841
[45] Date of Patent: Oct. 22, 1985

[54] ACTIVATED SILICON-CONTAINING ALUMINUM COMPLEX FLAME RETARDANT AND METHOD FOR FLAMEPROOFING

[75] Inventor: Fred Bernat, Cliffside Park, N.J.

[73] Assignee: San Mar Laboratories, Inc., Elmsford, N.Y.

[21] Appl. No.: 597,217

[22] Filed: Apr. 6, 1984

Related U.S. Application Data

[63] Continuation of Ser. No. 312,512, Oct. 19, 1981, abandoned.

[51] Int. Cl.$^4$ ................................................ C09D 5/14
[52] U.S. Cl. ................................ 427/372.2; 106/15.05; 106/18.12; 106/18.26; 427/397.7; 427/439
[58] Field of Search ............... 106/15.05, 18.12, 18.26; 427/383.1, 397.7, 439, 372.2

[56] References Cited

U.S. PATENT DOCUMENTS

| | | | |
|---|---|---|---|
| 4,247,410 | 1/1981 | Bernat | 252/305 |
| 4,277,355 | 7/1981 | Farcnik | 106/15.05 |
| 4,382,025 | 5/1983 | Sallay | 106/15.05 |

Primary Examiner—Lorenzo B. Hayes
Attorney, Agent, or Firm—Hopgood, Calimafde, Kalil, Blaustein & Judlowe

[57] ABSTRACT

An activated silicon-containing aluminum complex flameproofing agent containing minor amounts of halogen, silicon, oxygen and hydrogen, the silicon being present in amounts of at least trace and having a hexagonal structure; the ratio oxygen to hydrogen in the complex usually being 16:18 and the process for making such complex comprises the steps of treating substantially pure aluminum with acid, then with mercury, then with a halogen acid again to form a slurry. The slurry is then applied on paper, paper pulp, cellulose pulp, plywood, clothings, textiles and any structurally porous material for flameproofing same.

4 Claims, 5 Drawing Figures

ACTIVATED SILICON-CONTAINING ALUMINUM COMPLEX FLAME RETARDANT AND METHOD FOR FLAMEPROOFING

REFERENCE TO RELATED APPLICATIONS

This application is a continuation of application Ser. No. 312,512 filed Oct. 19, 1981, now abandoned.

This application is related to my U.S. Pat. Ser. No. 275,801 filed June 22, 1981 for ACTIVATED SILICON-CONTAINING ALUMINUM COMPLEX AND METHOD OF PREPARATION THEREOF.

SUMMARY OF THE INVENTION

The usefulness of the complex of the present invention will extend virtually to any application where such flame proofing would be advantageous. For example, the complex of this invention will affect the fire proofing and/or insulation of buildings, children's clothing, rugs, paper products, and many other organic flammable products.

Moreover, the subject complex is non-polluting, non-toxic, and safe environmentally, having no adverse impact of any kind in the atmosphere and water. It is non-corrosive.

In addition to its usefulness in making the complex, the slurry is also useful in the preparation of other products, such as the "propellant" (U.S. Pat. No. 795,115) and "fuel" (U.S. Pat. No. 810,103).

It is an object of the present invention to provide an activated silicon aluminum complex which is capable of releasing oxygen and hydrogen from an oxygen and hydrogen containing fluid.

Another object of the subject invention is to provide a unique slurry.

Another object of the subject invention is to provide a method for the preparation of said silicon-aluminum complex, including the preparation of the slurry.

Another object of this invention is to provide a method to apply the said slurry on paper, paper pulp, cellulose pulp, plywood, clothes, textiles and other porous materials in order to rend them totally non-flammable - fire proof.

Still other objects will become apparent from the ensuing description and appended claims and drawings.

According to this invention, the activated aluminum complex consists essentially of aluminum and minor amounts of chlorine, activated hexagonally structured silicon, oxygen and hydrogen; the oxygen and hydrogen being present in atomic proportions of usually 16:18 or occasionally 14:16, 18:20 or mixtures thereof and the sum of said chlorine, silicon, hydrogen and oxygen atoms not exceeding more than about 5 percent by weight of the aluminum atoms of said complex.

The complex can be prepared by the following sequence of steps:

1. Contacting aluminum metal having a purity preferably on the order of at least about 99.94% by weight, but including at least trace amount of silicon, with a source of acid of a type and concentration which will remove and inhibit the formation of oxide thereon; simultaneously, or thereafter, contacting said aluminum metal with mercury or less preferably a source of mercury in an oxygen-containing atmosphere;
2. At least partly immersing said mercury contacted aluminum in an acidic solution, containing halogen, to effect a slurry of particles of said mercury-contacted aluminum in said halogen-acidic solution, at a temperature of between ambient and not more than about 30° C.;
3. Increasing the viscosity of the slurry up to between 12,000 cps and 16,000 cps, preferably closer to 16,000 cps.
4. Adjusting the pH of said slurry to $3.0 \pm 0.2$.
5. Immersing, or spraying said adjusted slurry on the desired objects, provided that the said objects are provided with a desired capilarity.
6. Drying the prepared objects at room or any higher temperature. If the object is plywood, then the veneer surface should be pressed on the slurry-soaked pulp before the drying procedure.

BRIEF DESCRIPTION OF THE DRAWINGS

For a better understanding of the invention, reference will now be made to the accompanying drawings, wherein.

DETAILED DESCRIPTION OF THE INVENTION

Figure 1:
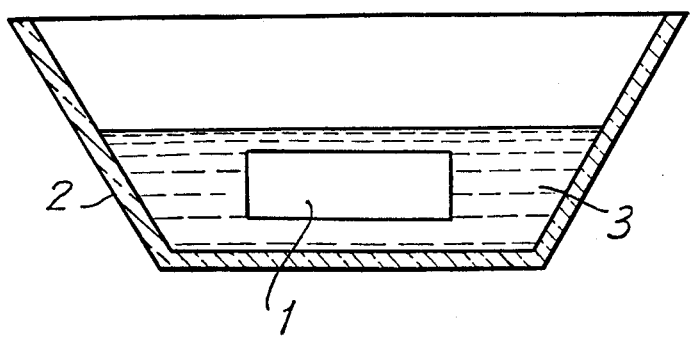
FIG. 1 is a schematic sectional elevational view of one embodiment of stage 1 of the process of the present invention.

The activated-silicon containing aluminum complex of this invention can be conveniently prepared, utilizing a six stage process, altough the process is not be narrowly construed as being limited to such. The first stage, the preparation of a form of aluminum which can be termed "phase one" can typically be carried out as follows:

Utilizing the apparatus of FIG. 1, an aluminum bar or rod (1) is placed, as shown, in a vessel (2), the latter preferably of glass, and a thin layer of hydrochloric acid (3) is placed thereover slightly, covering the aluminum. In this context the shape of aluminum in not narrowly critical. However, a bar or rod shape is generally preferred. The purpose of the acid treatment is to inhibit the formation of oxyde on the aluminum surface. HCl is usually the acid employed for this purpose.

It is further important that the aluminum be substantially pure, on the order of, but not limited, to about 99.94% pure and also contain amounts of silicon on the order of trade to about 60 to about 150 ppm. As a practical matter, whether the aluminum is sufficiently pure can be empirically determined since, if there is an abrupt rise in temperature, this indicates oxyde formation and that the aluminum starting material was not sufficiently pure. Therefore, the purposes of this application, the term "substantially pure aluminum" denotes that degree of purity which is empirically determinable to be capable of being used in the process of this invention.

The aluminum is then contacted or coated with mercury, preferably placing such in a bath of the same in a similar type apparatus; in the presence of any oxygen-gas-containing atmosphere, such as air. In either of these preliminary steps the temperature is not narrowly critical, but should not be such as to encourage oxide formation and/or chlorine gas. Ambient temperature is satisfactory.

Figure 2:
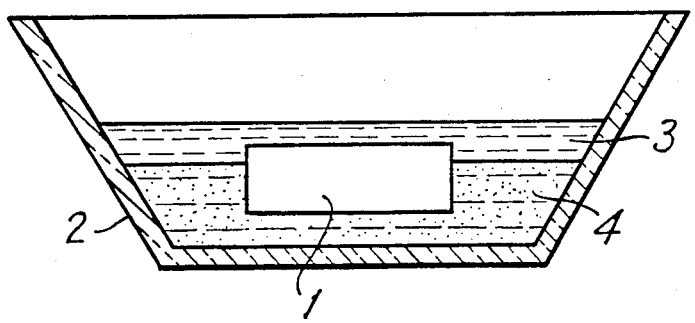
FIG. 2 is a schematic view similar to FIG. 1, showing another optional embodiment of stage 1 of the process of the present invention.

If desired, the acid and mercury contact can be made simultaneously as shown in FIG. 2. In this figure, the aluminum (1) is immersed in the acid bath (3) and the heavier mercury bath (4), the HCl forming a layer on the bath of mercury.

Whether the apparatus on FIGS. 1 or 2 or other suitable apparatus is used, the lenght of time of contact with the mercury can be minimal, on the order of between about fifteen and thirty seconds; longer contact, however, is not detrimental. Within the context of this invention, the mercury acts only as a catalyst which effects a change in the aluminum structure. As indicated above, this changed structure is "phase one".

The formation of "phase two" is the second stage in the process of this invention. This stage involves the formation of a slurry comprising phase one immersed in an acidic solution containing halogen. Particularly preferred among the suitable halogen solutions is hydrochloric acid.

Figure 3:
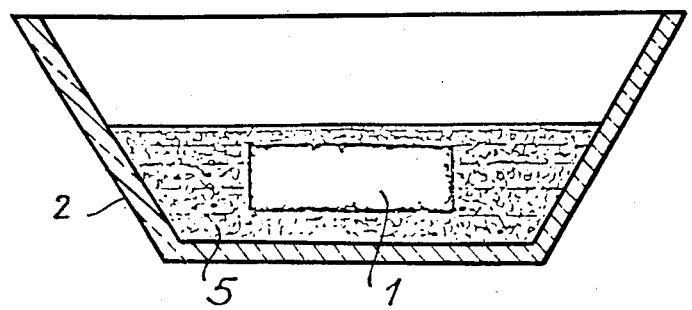
FIG. 3 is a schematic view similar to FIG. 1, showing the formation of the slurry in the HCl bath in stage two of the process of the present invention. In this embodiment, the aluminum is disposed substantially equidistant from the sides and bottom of the vessel.
Figure 4:
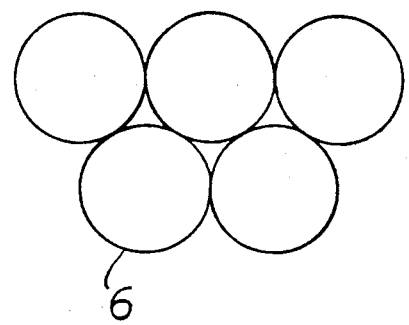
FIG. 4 is a depiction of the structure of the untreated, inactive silicon found in non-activated form in the aluminum.
Figure 5:
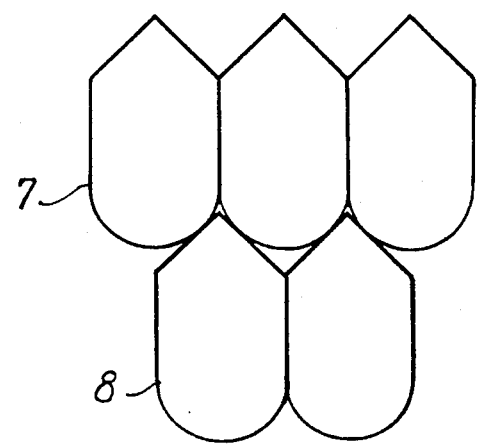
FIG. 5 is a depiction of the hexagonal structure of the silicon of the complex formed in the stages two and three of the process of the present invention, in the slurry.

The slurry can be formed in a number of ways and the method thereof is not critical in and of itself. For example, after contact with the mercury bath, the thus-treated aluminum rod or bar is then immersed in another vessel, containing a bath of HCl. The latter should have a normality of about 1 Normal to about 2 Normal, but the actual range of concentration is empirical. When phase one, which is soluble in HCl to some extent, is immersed in the acid solution, a rather viscous slurry, white in color, is formed. The slurry begins as a cloudy suspension and becomes increasingly dense. This is the consequence of particulate growth in and on the mercury-treated and activated aluminum rod or bar of phase one. This growth is shown in FIG. 3, wherein the thick slurry (5) is denoted as forming in the acid bath. As more and more particles form, the slurry becomes more and more viscous.

Depending on the size of the aluminum bar or the amount of HCl present, the formation of the slurry can continue up to the entire consumation of the phase one aluminum material. However as a practical matter, the reaction will usually stop before the aluminum bar is consumed completely because the slurry will become too dense for further growth to occur. At this point, the thick slurry thus formed can be removed, partly or completely; additional HCl is then added and slurry formation continued. As a practical matter, the viscosity of the slurry can be as low as 10,000 cps. For most efficient use, such viscosity should be, between about 12,000 cps and 16,000 cps.

This slurry is "phase two". In the formation thereof pursuant to the preparation of the complex, the temperature is important, that is between ambient and not more than about 30° C., preferably between 22° C. and 25° C. It should be noted that a sudden adverse rise in temperature of the reaction environment at this point could again mean that the aluminum starting material was not sufficiently pure.

Alternatively, though less desirably, the slurry can also be made "in situ" in the embodiment represented by FIG. 2. As shown in FIG. 2., the aluminum bar or rod is covered by HCl but is also partly submerged in the source of mercury. Optionally, the HCl need not continue to cover the aluminum after oxide formation thereon is prevented or inhibited. A portion of the aluminum can be exposed above the surface. In either case, wether the HCl continues to cover the surface of the aluminum or not, a growth of some kind of complex occurs. This growth, itself, in this embodiment, is not the "phase two" slurry of this invention. The latter occurs in this "in situ" treatment, either when the particles of the "growth" "fall off" into the acidic portion of the HCl/Hg bath, or optionally after removing the complex growth (whether in the aluminum surface-exposed to air, or in that covered by acid) and immersing the same in a separate HCl bath to form the slurry as herein before described. In either case the sequence has been followed of treating an oxide-free aluminum with mercury to change the structure of the aluminum and to effect its activation, and then contacting or continuing to contact said aluminum with HCl to cause the "phase two" slurry formation.

In the slurry-forming step, it has been found useful, in order to avoid undesireable heat from occuring, to position the aluminum bar or rod substantially equidistant from the sides and bottom of the vessel, or at a distance from the sides and bottom of the vessel, which is essentially the same as, or greater than the diameter of the bar or rod, a cylindrical rod shape being preferred. It is of course, possible to inhibit formation of undesireable heat without the above indicated special relationships; in this event, the avoidance of oxides as a consequence of overheating would have to be constantly monitored. In this regard, for example, the treated bar could be constantly removed, rewashed, reinserted and recoated with mercury.

The phase two slurry is quite acidic with a pH level of between about 3 and about 4. It also contains both hydrogen, oxygen and chlorine atoms, probably in ionic form therein. The reason for this is that the phase one material has clathrate capabilities, i.e., it can entrap or confine the hydrogen, oxygen and chlorine ions within the particles of the slurry.

While the aforesaid temperature gradients are important when forming the slurry preparatory to the subsequent formation of the complex, it should be noted that the slurry itself can also be formed using somewhat higher temperatures, on the order of up to about 40° C., and also starting with aluminum of slightly less purity.

The next stage in the process of forming the final complex, i.e., stage three, is to adjust the pH so that the chlorine defined within the said particles of the slurry becomes active; "active" have meaning potentially unstable but not to the extent that the chlorine is liberated as chlorine gas. In this regard, it is desirable that the pH level of the slurry ultimately reside at a pH of about 3.0±0.2. At this juncture, it could be noted that if the viscosity of the slurry is between about 12,000 and 16,000 cps, the slurry will contain between about 1.5 and about 3.0% aluminum suspended therein in elemental form.

The increase or decrease of the pH is accomplished by treating the phase two material with a strong hydroxide such as NaOH or KOH in case of increase, and with HCl in case of decrease. The normality is not critical, but usually can be between about 2 and 3 Normal concentration. The increased or decreased pH slurry can be termed "phase three". the slurry is now ready to be applied as a fire proof agent on the selected objects.

"Phase four" consists of selecting and impregnating the flamable objects with the said adjusted slurry. While the range is enormous, we will mention some basic materials in the every day use. Paper, paper pulp, cellulose pulp, playwood, chlothings, textiles etc. All of this materials has to be provided with a sufficient capilarity-porosity in order to be able to absorb the slurry of the phase three.

(a) Paper, carton or corrugated carton: the mentioned materials could be immersed in the slurry, or sprayed on with, and the dryed. Room temperature is sufficient, however any elevated temperature, in order to speed up the drying process would be acceptable. Depending of the paper's quality, and the way of application, the paper (or carton) could be also prepared to be strongly tension resistant and also to be almost transparent. Exposed to a normal flame, the paper and carton will char, without any flame or sparks, and without releasing any toxic or polluting substances in the atmosphere.

(b) Paper pulp: the paper pulp should be immersed in the slurry, squized under pressure, dryed completely. Used as an insulator, between two flamable layers such as a wooden wall or divider, the pulp becames not only a heat-cold insulator, but a fire protector on the layer opposite the one on which the fire starts.

(c) Cellulose pulp: the cellulose pulp should be immersed in the slurry, squized under pressure, and while is still wet, spred in thin layer between two veneers of playwood while in production. Once the veneer is posted over the pulp, considerable pressure should be applyed trough callender rollers or similar methods. In a period between 12 and 18 hours, the capilary chanels of the veneer will soak up the slurry from the pulp, rendering this way fireproof not only the center layer, but the whole playwood as such.

(d) Playwood: under c) is illustrated the preferrable way how to produce a fire proof playwood. However if the playwood is allready produced, is still possible to fireproof the said finished plywood sheets, provided that the said plywood is provided with capillary chanels sufficiently large in order to absorb the slurry when partially, sidewise immersed in it. No additional callender-roller pressure needed to be applied.

(e) Clothings and textiles: the slurry has to be mixed with a light hydrocarbon, not necessarely chlorinated, in proportion preferrably 1:3 but said proprtion coud be extended up to 1:5. The hydrocarbons, such as mineral spirits, light mineral oil etc, are required in order to give the fabric's structure the necessary flexibilty and elasticity. As by the paper (a), the fabrics will obtain also a considerralbly tension strenght.

This invention can be further illustrated by the following examples. Unless otherwise indicated all percentages are by weight:

EXAMPLE 1

Formation of the Slurry 500 grams of aluminum rod, having not more than about 0.1% impurities was placed in a 36 inch long shallow glass vessel as exemplified by FIG. 1. At a temperature of 20° C., the aluminum was contacted with 3N hydrochloric acid in amounts sufficient to cover the aluminum rod. Thereafter the aluminum rod was removed from the first HCl bath and immersed in a mercury bath for approximately 20 seconds under moist (about 30% relative humidity) air-atmospheric conditions. There also being a layer of HCl covering the mercury bath. The mercury contacted aluminum rod was then re-immersed in a bath of 2N HCl. At this point the rod was positioned equidistant from the sides and bottom of the vessel. A growth was observed on the immersed surface of aluminum, on all sides thereof. The aluminum bar also begins to dissolve in the HCl bath.

Almost immediately a milky white cloud began to appear. After about 8 hours a slurry began to be discernable. The temperature was kept below 30° C. The reaction continued until all of the aluminum bar was consumed. Before the bar was consumed, however, the slurry became so thick the reaction was severely inhibited. This occurred after about 48 hours. This thick slurry was then removed and fresh HCl added. This was continued until the dissolution of the aluminum was completed. The slurry had a pH of 3.5. The pH of the slurry was then adjusted to 3.0±0.2 by increasing the hydrogen ion content by addition of HCl.

EXAMPLE 2

Application of the Slurry

An amount of about 20 Kg. of cellulose pulp is immersed in the slurry at the room temperature. Then squized with a suitable apparatus, so that the actualy retained amount of the slurry in the pulp is about 3–4% by weight. Immediately the soaked pulp is spread in a 2 thick layer between the veneers of a sheet of a playwood. The same playwood sheet is than placed between the rollers of a calender machine under pressure. In about 48 hours the capillary chanels of the veneers are soaking up the slurry from the pulp in sufficient quantity in order to be fireproof. The color or polish of the veneer is in no way affected by this procedure.

UTILITY AS FIREPROOFING AGENT

As a group, the existant fire-retardants because of they compositions are under severe attack by enviromental agencies. Beside the limited efficiencies, they are also irritants, and many times toxic either while burning or while contacting the skin. None of the existing commercialy available product is fire proof. There are only fire retardants at the best.

The complex of this invention meets this need. The object provided with the necessary capillarity chanels becames completely fire proof under fire of normal intensity. Under normal intensity is intendent a flame or source of flame provenient from wood, coal, liquid gas, oil, gasoline, or any other hydrocarbon. Even exposed to flame produced by special very high temperature chemicals like in blow-torch, welding apparatus etc, the said product is still highly fire-retardant. Furthermore is non reactive, non-polluting and indifferent to ozone. It is applyable to an extremely broad range of commercial products, without changing or affecting they physical aspects or chemical composition. Moreover, in use, the subject inventive material has controllable parameters within accepted temperature/product requirements, as well as industry and government regulations. It is easily maneagable, non toxic or irritant and totally safe for the environment.

THEORETICAL EXPLANATION

In the Patent Ser. Nos. 795,115 and 810,103, it is stated that the structure of aluminum can be changed by chemical and electrochemical attack. The cylindrical or spheroidal shape of the silicon trace material was found to change to the hexagonal shape as a consequence of attack by the "free chlorine" of the slurry when such was applied to an ordinary aluminum foil. (U.S. Pat. No. 795,115). It is believed that the same change in structure occurs in the silicon particles contained in the aluminum particles suspended in the slurry due to the interaction of the mercury-treated aluminum with the hydrochloric acid solution. This change in structure which can be observed in the finished oxygenated solid fuel (U.S. Pat. No. 810,103) is also believed to be significant, i.e., it furnishes some understanding of what has and does take place which enables the subject composition to function as a fuel proofing agent.

It should be noted that when ordinary aluminum is introduced into an HCl solution, e.g., 1N or 2N, the production of aluminum chloride (and water) occurs. However, the mercury treated aluminum employed in this invention is a quite a different creature. There is still the formation of $AlCl_3$ and other aluminum compounds as well, when such is immersed in the HCl solution. However, after the passage of from about 8 to 72 hours a slurry is formed starting as a faint white cloud. This is a consequence of a "growth" on the "treated" aluminum which growth then "falls off" or "flakes off" into the acid bath and begins to form the slurry. After a passage of about 8 hours or so, the slurry is in full "bloom" and a discernible increase in viscosity begins to occur, leading to the preferred viscosity range of 12,000–16,000 cps.

In this slurry, a relatively small amount, weightwise of "activated" aluminum growth particles is suspended; perhaps as a colloid. As stated previously, the percentage of the same is between about 0.7 and 1.5% by weight. These "growth" particles, however, now contain entrapped therein because of their clathrate properties, "free chlorine" (from the HCl) oxygen and hydrogen probably in molecular or ionic form. The silicon of the aluminum has also been changed to the hexagonal structure.

Thus the slurry at least contains:

(a) The reaction product of aluminum and hydrochloric acid in solution, e.g., $Al^{***}Cl-$, $H^*$ and $OH$ ions.

(b) Free "activated" aluminum suspended probably colloidally, containing hexagonally structured silicon and also additionally containing traces of chlorine, hydrogen and oxygen entrapped therein.

The unusual properties of the slurry may possibly also be explainable as a consequence of "Van der Waal's forces" or the well-known ability of particles in colloidal suspension to attract and retain on their surface dissolved substances and solvent molecules, i.e., to have molecules present in the solution even in ionic form become entrapped in or adhered on the particulate matter of the slurry or colloid. Whatever is the explanation, the slurry is a critical medium for the fireproofing.

Although the present invention has been described with references to particular embodiments and examples, it will be apparent to those skilled in the art that variations can be made.

What is claimed is:

1. A composition for flame-proofing flammable articles comprising a slurry comprising activated-silicon containing aluminum particles prepared by the steps of
   (a) contacting aluminum metal containing at least trace amounts of silicon with an acid of the type which will remove oxide coatings from and inhibit oxide formation thereon;
   (b) simultaneously or thereafter contacting said aluminum with mercury or a source of mercury;
   (c) immersing said mercury contacted aluminum metal in an acid bath at ambient temperature to not more than about 40° C., whereby particles are formed on the metal which on mixing with the acid bath form the slurry; and
   (d) adjusting the pH of the slurry to 3.0±0.2.

2. The composition according to claim 1, wherein the acid of steps a) and c) is HCl.

3. A method for flame-proofing flammable articles which comprises
   (a) contacting said articles with a slurry comprising activated-silicon containing aluminum particles prepared by contacting aluminum metal containing at least trace amounts of silicon with an acid of the type which will remove oxide and coatings from and inhibit oxide formation thereon;
   simultaneously or thereafter contacting said aluminum with mercury or a source of mercury;
   immersing said mercury contacted aluminum metal in an acid bath at ambient temperature to not more than about 40° C., whereby particles are formed on the metal which on mixing with the acid bath form the slurry; and
   adjusting the pH of the slurry to 3.0±0.2; and
   (b) drying said slurry coated articles.

4. The method according to claim 3, wherein said articles are selected from the group consisting of paper pulp, cellulose pulp and cardboard.

* * * * *